though the dehydrogenation catalyst.

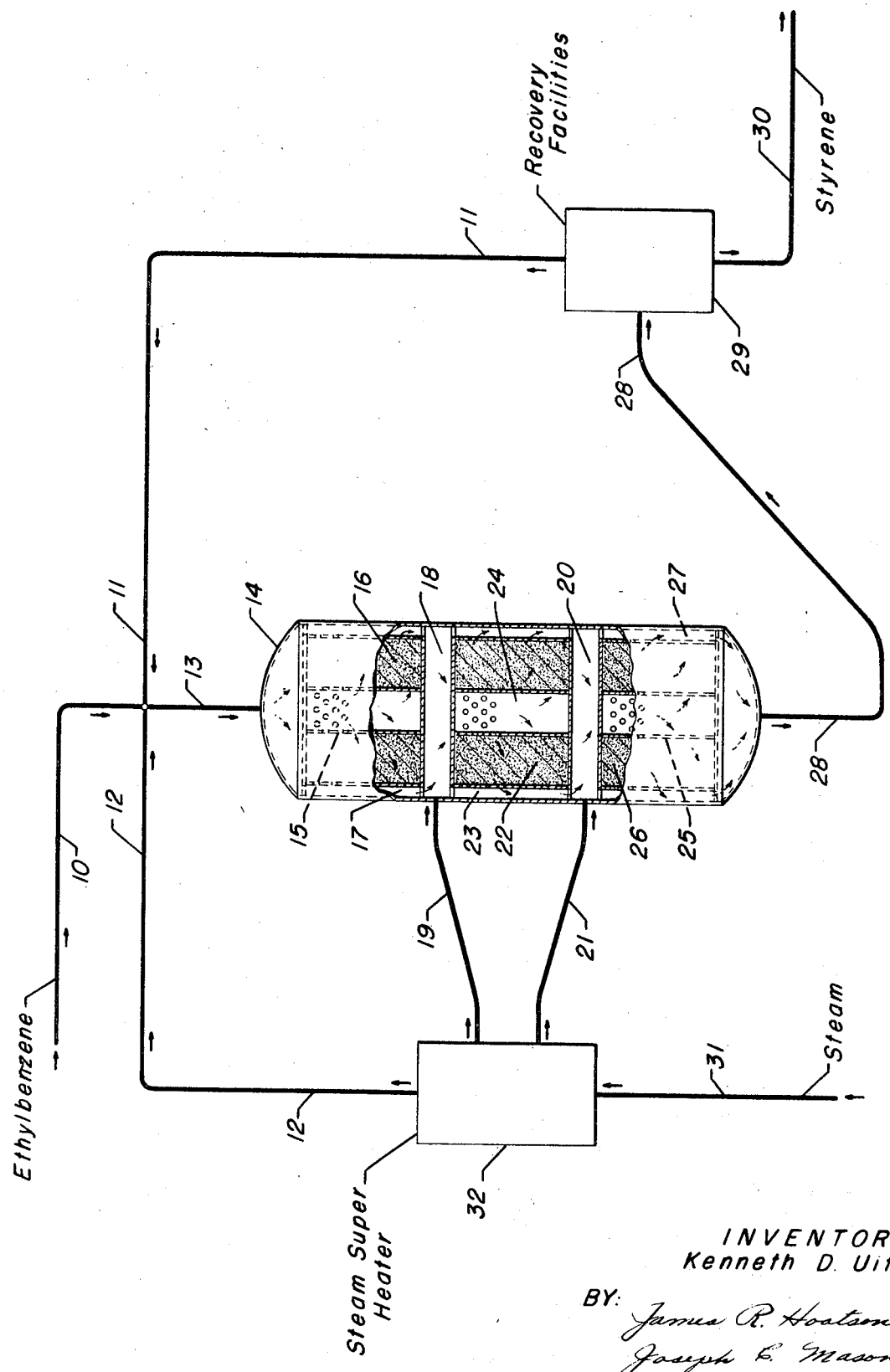

United States Patent Office 3,515,763
Patented June 2, 1970

3,515,763
PRODUCTION OF STYRENE
Kenneth D. Uitti, Bensenville, Ill., assignor to Universal Oil Products Company, Des Plaines, Ill., a corporation of Delaware
Filed Apr. 22, 1968, Ser. No. 722,986
Int. Cl. C07c *15/10, 5/18*
U.S. Cl. 260—669                                    7 Claims

ABSTRACT OF THE DISCLOSURE

Method and apparatus for the dehydrogenation of ethylbenzene to styrene. The conversion takes place in a radial flow reactor configuration wherein conversions as high as 50% and, in some cases, up to 73% of ethylbenzene to styrene is made possible.

BACKGROUND OF THE INVENTION

This invention relates to an improved method and apparatus for the dehydrogenation of ethylbenzene to styrene. More specifically, this invention relates to a more economical and facile method for obtaining styrene through the catalytic dehydrogenation of ethylbenzene. It particularly relates to an improved method for achieving thermal balance in the overall dehydrogenation of ethylbenzene using a plurality of conversion zones.

Basic methods are well known in the art for the production of styrene from ethylbenzene. However, the prior are methods have achieved, generally, poor conversions of ethylbenzene to styrene per pass through the catalytic system. Typically, the prior art processes achieve a conversion of about 30% to 40%. The recovery of styrene in high concentration from such a low conversion prior art process requires extensive distillation apparatus in order to separate the styrene from the unreacted ethylbenzene and other reaction products. Usually, the ethylbenzene is recycled in large quantities thereby necessitating increased sizing of equipment including reactor vessels and fractionation columns.

Those skilled in the art recognizes the importance of being able to economically produce styrene since this chemical is extensively employed throughout commerce as the raw material in the production of resins, plastics, and elastomers. Specifically, styrene is copolymerized with butadiene to produce a high molecular weight synthetic rubber. Although styrene may be recovered in limited quantities from various coal tars and heavy crude oils, it is preferred to synthesize large quantities by the dehydrogenation of ethylbenzene. The raw material, ethylbenzene, can either be separated from selected petroleum fractions by superdistillation or can be prepared through the alkylation of benzene with ethylene.

The prior art methods for producing styrene are, generally, carried out by passing a mixture of ethylbenzene and steam over a fixed bed of dehydrogenation catalyst. In order to heat the reactants to reaction temperature, it is also general practice to admix the ethylbenzene, which is usually at a temperature significantly below reaction temperature, with steam which has been superheated to a temperature above the reaction temperature so that the mixture is at reaction temperature as it passes over the dehydrogenation catalyst.

Since the basic chemical reaction involved, namely the dehydrogenation of ethylbenzene to styrene, is endothermic, there is a significant decrease in the reaction zone temperature as the reaction proceeds. It is not unusual in these prior art processes to witness a decrease in temperature of perhaps 100° F. to 200° F. within the reaction zone. Naturally, as the temperature decreases, the rapidity of the reaction also decreases so that the overall conversion per pass of ethylbenzene in the process declines to a point where it would be economically unattractive unless processing means were found to overcome this disadvantage.

Again, the prior art attempted to solve this problem by drastically increasing the temperature of the superheated steam so that the difference between the inlet temperature of the reactants and the outlet temperature of the reaction products averaged, generally, the required reaction temperature. However, it was noted that at the instant the superheated steam is admixed with the ethylbenzene, the ethylbenzene undergoes, to some extent, decomposition or cracking through a pyrolytic reaction. In many instances such pyrolysis is effected to a degree that the process becomes uneconomical due to the loss of ethylbenzene to toluene, benzene, carbon monoxide, carbon dioxide, polymeric materials, tars, etc. Another disadvantage of the prior art processes is involved with the utility cost in raising the temperature of large quantities of steam to a level far above that required for effecting the dehydrogenation of the ethylbenzene to styrene. Additionally, in spite of all of these efforts to control the reaction, conversion of ethylbenzene to styrene by the vast majority of prior art processes remains at approximately the 30% to 40% level.

More recently, the prior art has suggested means for increasing the level of conversion by utilizing various schemes for admixing the ethylbenzene and steam in such a way as to avoid the pyrolytic reaction. One of the prior art methods has been to separate the steam into several portions whereby additional steam is added by the catalytic zones in order to reheat the reactants to reaction temperature. In these latter processes, conversions as high as 50% for ethylbenzene to styrene are alleged. However, these latter process schemes do not indicate the method by which the steam and ethylbenzene are heated with the result that utility costs are still prohibitively high for the achievement of the increased conversion level. Still further, these latter process schemes still require the heating of large quantities of steam to superheat levels and still require considerable catalytic masses in order to maintain conversions anywhere near an economically attractive level.

Accordingly, it is still desirable that those skilled in the art be furnished with an improved method for the conversion of ethylbenzene to styrene wherein conversions as high as 50%, and in some cases 75%, are obtained and wherein capital investment, utility, and catalyst costs are maintained at an attractive economic level.

SUMMARY OF THE INVENTION

Accordingly, it is an object of this invention to provide an improved method for the dehydrogenation of ethylbenzene to styrene.

It is another object of this invention to provide an improved method for the dehydrogenation of ethylbenzene to styrene characterized by a high conversion per pass.

It is a specific object of this invention to provide an improved method for effectuating the catalytic reaction in a facile and economic manner whereby considerable economy of operation is achieved while maintaining a high conversion per pass of ethylbenzene to styrene.

Therefore, the present invention provides an improved method for the conversion of ethylbenzene to styrene via catalytic endothermic dehydrogenation reaction which comprises: (a) passing a feed mixture containing ethylbenzene and steam in outward radial flow direction through a plurality of annular dehydrogenation reaction zones, each zone containing particulate catalytic material, under conversion conditions including a relatively high temperature; (b) withdrawing effluent containing stream from the first said zone at a relatively low temperature; (c) admixing said low temperature effluent with added superheated steam in a mixing zone prior to introduction of the admixture in outward radial flow manner through the next succeeding reaction zone under conditions sufficient to increase the temperature of the effluent to a predetermined relatively high level; (d) introducing said admixture into said next succeeding reaction zone in the manner indicated; and, (e) recovering styrene from the effluent of the last reaction zone in said plurality.

Another embodiment of this invention includes the method hereinabove wherein the superheated steam added to each said effluent is at increasingly higher temperature in each effluent admixture.

Thus, it can be seen from the embodiments of the present invention presented hereinabove that styrene in high concentration is produced by the dehydrogenation of ethylbenzene in a fixed multi-bed catalytic annular reaction zone wherein the reactants are passed through a plurality of such zones in radial flow manner. By operating in accordance with the practice of this invention, it was found that the temperature decrease through a given reaction zone was minimized with the result that less additional superheated steam needed to be added to the effluent when compared with the prior art schemes. Additionally, the use of the radial flow reactor design achieved less pressure drop through the overall reaction system than would otherwise be obtained, thereby minimizing the pressure at which the reactants needed to be introduced into the first reaction zone and reduces the amount of catalyst necessary to effectuate the reaction. By the practice of the present invention, conversions of ethylbenzene to styrene per pass exceed 50% by weight, and, typically, require no more than a total of five (5) pounds of steam per pound of styrene produced.

DETAILED DESCRIPTION OF THE INVENTION

The catalyst employed for the dehydrogenation reaction is preferably an alkali-promoted iron catalyst. Typically, such a catalyst may consist of 85% by weight ferrous oxide, 2% by weight of chromia, 12% by weight of potassium hydroxide, and 1% by weight of sodium hydroxide. Other catalyst compositions include 90% by weight iron oxide, 4% by weight chromia, and 6% by weight potassium carbonate. While these known commercial dehydrogenation catalysts are preferred, other known catalysts may be used, including those comprising ferrous oxide-potassium oxide, other metal oxides and/or sulfides, including those of calcium, lithium, strontium, magnesium, beryllium, zirconium, tungsten, molybdenum, titanium, hafnium, vanadium, aluminium, chromium, copper, and mixtures of two or more including chromia-alumina, alumina-titania, alumina-vanadia, etc. Similarly, the various methods of preparing the aforesaid catalysts are well known within the prior art.

The conditions in the first catalyst bed, sufficient to achieve the aforesaid conversion of ethylbenzene to styrene, include not only the catalyst as described and the temperatures specified, but also include the weight hourly space velocity. The space velocity as used herein is defined as pounds of ethylbenzene charged per hour per pound of catalyst disposed within reactor 18. Typically, the weight hourly space velocity is within the range of about 0.1 to 1.0, and preferably within the range of about 0.2 to about 0.7. The space velocity at any given time is correlated with the selected inlet temperature to result in a reactor product effluent having a temperature within the range of about 1000° F. to 1400° F., typically 1065° F.

The amount of catalyst contained in each catalyst bed may be varied considerably. Usually, the amount of catalyst is expressed in terms of bed depth which may range from 6 inches to 50 to 60 feet, depending upon such conditions as alkylated aromatic hydrocarbon feed rate and the amount of heat which therefore must be added to effectuate the reaction at an economical rate. Typically, the bed depth may range from 2 feet to 6 feet.

The reactor pressure may also be varied over a considerable range. Preferably, atmospheric pressure, e.g. 4 to 20 p.s.i.g., is used; although, in some cases, subatmospheric or significant superatmospheric pressure may be desirable. sufficient pressure must be maintained at the reactor inlet to overcome the pressure drop through the multi-beds of catalyst contained in the reactor vessels or in separate vessels if each such bed is contained in a separate reactor. Either multiple beds contained in a single reactor, or single beds in multiple reactors, or a mixture of these arrangements, may be used in the practice of this invention.

As the reactants contact the catalyst contained in, for example, the first catalyst bed, there is a temperature and pressure decrease observed across the catalyst bed due to the endothermic nature of the reaction and due to the pressure drop characteristics of the reactor design including the presence of catalyst therein. For example, without additional heat being required, the temperature of the effluent leaving the first catalyst bed would probably be in the order of 100° F. to 200° F. or more, less than the inlet temperature selected for the combined charge material to the first catalyst bed. Similarly, depending upon the amount of catalyst contained in the first reaction zone, the pressure of the effluent from the first catalyst bed preferably would be less than 10 p.s.i.g. lower than the selected pressure for the combined charge to the first catalyst bed. Typically, the pressure drop through the first catalyst bed would be within the range from 2 to 6 p.s.i.g. and if a similar pressure drop were observed across, for example, three (3) catalyst beds, the total pressure required at the inlet of the first catalyst bed would be significant, e.g. in the range from 6 to 18 p.s.i.g. As those skilled in the art are aware, an increase in pressure within the reaction zone frequently causes an increase in the severity of the other operating conditions necessary to convert ethylbenzene to styrene. The increased severity has been observed to cause an increase in polymer and tar formation and increases the tendency of the styrene produced to polymerize within the reactor and attendant equipment.

Accordingly, the essence of the present invention is embodied in the technique of passing a feed mixture comprising ethylbenzene and superheated steam into an annular dehydrogenation reaction zone in an outward radial flow manner and thereafter withdrawing from the outer perimeter of the annular reaction zone an effluent-containing stream at a significantly decreased temperature. Additional superheated steam is added to the effluent and the process repeated through each succeeding annular reaction zone. Finally, styrene in high concentration is recovered from the effluent of the last reaction zone in said plurality.

In a commercial installation, the number of reaction zones or beds may vary from 1 to 5, with a typical configuration comprising 3 reaction zones. In the typical commercial application, therefore, the total steam required for the reaction may be proportioned in the following manner with the total steam, preferably not exceeding three (3) pounds of steam per pound of ethylbenzene:

A first portion of the steam to be admixed with the raw charge to the first reaction zone should be from 0.65 to 1.0 pounds per pound;

A second portion of the steam should be injected into the first effluent at a rate from 1.0 to 1.2 pounds per pound;

And, a third portion of steam should be added to the effluent from the second reaction zone at a rate from 0.80 to 1.35 pounds per pound; with the other reaction conditions being selected such that the total product effluent stream from the last reactor contains from 4 to 6 pounds of steam per pound of styrene in such effluent stream.

The invention may be more fully understood with reference to the appended drawing which is a schematic representation of one embodiment of the present invention.

DESCRIPTION OF THE DRAWING

With reference now to the accompanying drawing, an ethylbenzene-containing feedstock enters the process through line 10 being admixed with recycle ethylbenzene in line 11, the source of which is hereinafter described. In addition, the ethylbenzene in line 10 is admixed with from 5% to about 15% by weight of the total amount of steam utilized in the overall process and entering through line 12 at a temperature of about 1400° F. The steam-ethylbenzene mixture at a temperature of about 1200° F. passes via line 13 into reactor 14 which contains three (3) annular fixed beds of catalyst, 16, 22, and 26, respectively. (As defined in the prior art, the dehydrogenation of ethylbenzene is generally effected at a reaction temperature from within the range of about 932° F. to 1292° F.).

As the steam and ethylbenzene mixture passes into reactor 14, the admixture proceeds into concentrically placed conduit 15 which has perforations therein. These perforations, of course, are of such a size and shape that the catalytic mass 16 cannot pass through the perforations. The admixture next proceeds in outward radial flow manner through catalyst bed 16 and is subsequently withdrawn at the outer perimeter of catalyst bed 16 through passageway 17. This first effluent is at a temperature of about 1100° F. and is then channeled from passageway 17 into mixing zone 18.

In mixing zone 18, superheated steam 19 is introduced at a temperature of about 1500° F. in an amount previously described sufficient to raise the temperature of this first effluent to substantially reaction temperature. It is to be noted that the outlet of mixing zone 18 is concentrically located to the inlet of the next succeeding reaction zone.

Therefore, the reheated first effluent plus added steam pass through conduit 24 in outward radial flow manner through a second annular catalytic mass 22 wherein additional conversion of ethylbenzene to styrene takes place. A second effluent is withdrawn from the outer perimeter of catalyst bed 22 at a temperature of about 1100° F. through passageway 23 and is thereafter channeled into mixing zone 20 in a manner identical to the manner previously described for mixing zone 18.

Additional superheated steam at a temperature of about 1600° F. is introduced into mixing zone 20 via line 21 in an amount previously described sufficient to raise the temperature of the second reaction zone effluent to substantially reaction temperature. In similar manner, the reheated second reaction zone effluent passed through concentrically located conduit 25 in outward radial flow manner through third catalyst bed 26. A third reaction zone effluent is passed through passageway 27 and out of reactor 14 via line 28 and sent to product recovery facilities 29.

The total amount of steam for the process enters the process via line 31 and passed into steam superheater 32 of a conventional type and design well known to those skilled in the art. By proper operation of steam superheater 32, the temperature of the superheated steam in lines 12, 19, and 21 may be substantially the same, but preferably are at a succeeding higher temperature, to wit: the temperature of the superheated steam in line 21 is greater than that of the steam in line 19 which in turn is greater than the temperature of the steam in line 12.

Product recovery facilities 29 are conventional in nature and usually comprise distillation facilities for separating the unreacted ethylbenzene from the product styrene and/or distillation facilities for recovering products made in the reaction, such as benzene and toluene, from the desired products. Preferably, ethylbenzene in high concentration is recovered from facilities 29 and returned to the reaction zone via line 11 in the manner aforesaid. Styrene in high concentration and high purity is withdrawn from the process via line 30.

It is understood that the various temperatures specifically mentioned in the foregoing description were employed for the sole purpose of illustrating one embodiment of the present invention. These temperatures, of course, will be subject to change depending upon (1) the temperature at the inlet to the reaction zone, generally, being within the range from about 1050° F. to about 1300° F., (2) the weight hourly space velocity with respect to the ethylbenzene, generally, being within the range from about 0.1 to about 1.0 but correlated with the inlet temperature to result in a reaction zone effluent from the final catalyst bed having a temperature from within the range of about 950° F. to 1250° F., (3) and the precise character of the catalyst and the manner in which it is disposed within the reaction zone.

PREFERRED EMBODIMENT

Thus, from the description and teachings presented hereinabove, the preferred embodiment of the present invention includes an improved method for the conversion of ethylbenzene to styrene via catalytic dehydrogenation with steam in a plurality of reaction zones which comprises the steps of: (a) admixing an ethylbenzene-containing feedstock with superheated steam at a first relatively high temperature thereby producing a feed mixture at substantially reaction temperature; (b) passing the feed mixture into a first annular dehydrogenation reaction zone in an outward radial flow manner; (c) withdrawing from the outer perimeter of said first reaction zone a first effluent containing styrene at a relatively low temperature; (d) channeling said first effluent into a first mixing zone having an outlet concentrically located to the next succeeding annular reaction zone; (e) passing superheated steam into said first mixing zone at a second relatively high temperature in direct contact with said first effluent; (f) withdrawing the admixture of steam and first effluent from said outlet of step (d) at substantially reaction temperature; (g) passing the admixture of step (f) into a second annular dehydrogenation reaction zone in an outward radial flow manner; (h) withdrawing from the outer perimeter of said second reaction zone a second effluent containing styrene at a relatively low temperature; (i) channeling said second effluent into a second mixing zone having an outlet concentrically located to the next succeeding annular reaction zone; (j) passing superheated steam into said second mixing zone at a third relatively high temperature in direct contact with said second effluent; (k) withdrawing the admixture of steam and second effluent from said outlet of step (i) at substantially reaction temperature; (l) passing the admixture of step (k) into a third annular dehydrogenation reaction zone in an outward radial flow manner; and, (m) withdrawing from the outer perimeter of said third reaction zone a third effluent containing styrene in high concentration.

A particularly preferred embodiment includes the method hereinabove wherein the first relatively high temperature is greater than 1350° F. and said reaction temperature is from 932° F. to 1292° F.

The invention claimed:

1. Method for the conversion of ethylbenzene to styrene via catalytic endothermic dehydrogenation reaction which comprises:

(a) passing a feed mixture containing ethylbenzene and steam in outward radial flow direction through a plurality of annular dehydrogenation reaction zones, each zone comprising particulate catalytic material, under conversion conditions including a relatively high temperature;

(b) withdrawing effluent containing styrene from the first said zone at a relatively low temperature;

(c) admixing said low temperature effluent with added superheated steam in a mixing zone prior to introduction of the admixture in outward radial flow manner through the next succeeding reaction zone under conditions sufficient to increase the temperature of the effluent to a predetermined relatively high level;

(d) introducing said admixture into said next succeeding reaction zone in the manner indicated; and, (e) recovering styrene from the effluent of the last reaction zone in said plurality.

2. Method according to claim 1 wherein said plurality is from three to five.

3. Method according to claim 2 wherein the superheated steam added to each said effluent is at increasingly higher temperature in each effluent admixture.

4. Method for the conversion of ethylbenzene to styrene via catalytic dehydrogenation with steam in a plurality of reaction zones which comprises the steps of:

(a) admixing an ethylbenzene containing feedstock with superheated steam at a first relatively high temperature thereby producing a feed mixture at substantially reaction temperature;

(b) passing the feed mixture into a first annular dehydrogenation reaction zone in an outward radial flow manner;

(c) withdrawing from the outer perimeter of said first reaction zone a first effluent containing styrene at a relatively low temperature;

(d) channeling said first effluent into a first mixing zone having an outlet concentrically located to the next succeeding annular reaction zone;

(e) passing superheated steam into said first mixing zone at a second relatively high temperature in direct contact with said first effluent;

(f) withdrawing the admixture of steam and first effluent from said outlet of step (d) at substantially reaction temperature;

(g) passing the admixture of step (f) into a second annular dehydrogenation reaction zone in an outward radial flow manner;

(h) withdrawing from the outer perimeter of said second reaction zone a second effluent containing styrene at a relatively low temperature;

(i) channeling said second effluent into a second mixing zone having an outlet concentrically located to the next succeeding annular reaction zone;

(j) passing superheated steam into said second mixing zone at a third relatively high temperature in direct contact with said second effluent;

(k) withdrawing the admixture of steam and second effluent from said outlet of step (i) at substantially reaction temperature;

(l) passing the admixture of step (k) into a third annular dehydrogenation reaction zone in an outward radial flow manner; and, (m) withdrawing from the outer perimeter of said third reaction zone a third effluent containing styrene in high concentration.

5. Method according to claim 4 wherein said first, second, and third relatively high temperatures are substantially the same.

6. Method according to claim 4 wherein said third relatively high temperature is greater than said second relatively high temperature is greater than said first relatively high temperature.

7. Method according to claim 6 wherein said first relatively high temperature is greater than 1350° F. and said reaction temperature is from 932° F. to 1292° F.

References Cited
UNITED STATES PATENTS

| | | | |
|---|---|---|---|
| 3,118,006 | 1/1964 | Lovett et al. | 260—669 |
| 3,402,212 | 9/1968 | Gantt | 260—669 |
| 3,417,156 | 12/1968 | Berger | 260—669 |

DELBERT E. GANTZ, Primary Examiner

C. R. DAVIS, Assistant Examiner